(12) United States Patent
Benjamin

(10) Patent No.: US 8,817,575 B1
(45) Date of Patent: Aug. 26, 2014

(54) TRANSDUCER FOR HIGH PRESSURE ENVIRONMENT

(75) Inventor: Kim C. Benjamin, Portsmouth, RI (US)

(73) Assignee: The United States of America as represented by the Secretary of the Navy, Wasington, DC (US)

( * ) Notice: Subject to any disclaimer, the term of this patent is extended or adjusted under 35 U.S.C. 154(b) by 467 days.

(21) Appl. No.: 13/248,359

(22) Filed: Sep. 29, 2011

(51) Int. Cl.
*G01S 15/88* (2006.01)
*H04B 11/00* (2006.01)
*B06B 1/06* (2006.01)

(52) U.S. Cl.
CPC .............. *B06B 1/0622* (2013.01); *B06B 1/0655* (2013.01)
USPC .............. 367/92; 310/334; 310/337; 367/141

(58) Field of Classification Search
CPC ........................... H04R 2217/03; H04B 11/00
USPC .............................. 367/92, 141; 310/334, 337
See application file for complete search history.

(56) References Cited

U.S. PATENT DOCUMENTS

| | | | | |
|---|---|---|---|---|
| 4,354,132 A | * | 10/1982 | Borburgh et al. | 310/334 |
| 4,373,143 A | * | 2/1983 | Lindberg | 310/334 |
| 4,811,307 A | * | 3/1989 | Pohlenz et al. | 367/135 |
| 5,446,333 A | * | 8/1995 | Ishida et al. | 310/334 |
| 6,433,464 B2 | * | 8/2002 | Jones | 310/328 |
| 2010/0147080 A1 | * | 6/2010 | Nieters et al. | 73/600 |

* cited by examiner

*Primary Examiner* — Ian J Lobo
(74) *Attorney, Agent, or Firm* — James M. Kasichke; Michael P. Stanley

(57) ABSTRACT

A transducer for sub-ocean bottom imaging includes: a housing capable of withstanding hydrostatic pressure of about 9,000 pounds per square inch; a transmitting layer positioned within the housing to transmit two primary high frequency transmit beams that generate a low frequency signal whose frequency is an arithmetic difference between the two primary beams for high resolution sub-ocean bottom imaging while maintaining high spatial resolution or directivity; and a receiving layer collocated with the transmitting layer within the housing that is mechanically tuned to resonate at the difference frequency producing high receive sensitivity.

14 Claims, 4 Drawing Sheets

TRANSDUCER FOR HIGH PRESSURE ENVIRONMENT

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention is directed generally to transducer and more specifically to a compact multi-layered transducer capable of withstanding hydrostatic pressures in the order of 9,000 pounds per square inch (psi) particularly for sub-ocean bottom imaging applications.

(2) Description of the Prior Art

Conventional sub-bottom profiling systems rely on relatively low frequency transducers in the order of 3.5 kHz transducers to penetrate and explore the oceans' sediments. However, necessity dictates that these transducers need to be small enough to fit on their intended platforms (such as towed underwater vehicles, tethered bodies, and the like). As a result of their small size compared to the required acoustic wavelength, they provide little to no acoustic directionality, and their lateral spatial resolution is poor.

Background information in this field is provided in the following references, each of which is incorporated in their entirety: P. J. Westervelt, "Parametric Acoustic Array," J. Acoust. Soc. Am. 35, p. 535 (1963); C. H. Sherman and J. L. Butler, "Transducers and Arrays for Underwater Sound" (Springer, New York, 2007) (See page 156); L. E. Kinsler and A. R. Frey, "Fundamentals of Acoustics" (John Wiley and Sons, New York, 1962) (See page 141); U.S. Pat. No. 6,255,761 to Benjamin, "Shaped piezoelectric composite transducer and method of making."

In response to a need to explore the ocean sub-bottom from small autonomous vehicles and other platforms, there is a need for a low cost scalable piezocomposite-based multilayer parametric mode transducer that overcomes the above and other shortcomings of the prior art.

SUMMARY OF THE INVENTION

Accordingly it is an object of the present invention to provide a simple, compact, multi-layered transducer configuration capable of withstanding hydrostatic pressures in the order of 9,000 psi for sub-ocean bottom imaging applications.

It is another object of the present invention to provide a transducer for use with sub-ocean bottom imaging having broadband parametric mode operation, typically over a decade in frequency bandwidth.

It is another object of the present invention to provide a transducer having a narrow low frequency transmit beam for high resolution sub-ocean bottom imaging applications.

It is another object of the present invention to provide a transducer having a high gain receiver tuned to the low transmitted difference frequency signal to provide increased system signal to noise ratio.

It is another object of the present invention to provide a transducer with transmit or receive apertures that could be subdivided for acoustic beam steering or variable spatial resolution.

It is yet another object of the present invention to provide a transducer having a scalable size and frequency range of operation.

Accordingly, there is provided a transducer for sub-ocean bottom imaging. The transducer includes a housing capable of withstanding hydrostatic pressure in the operating environment. A transmitting layer is positioned within the housing for generating two primary high frequency acoustic signals which interact parametrically to produce a low frequency, directive transmit beam for high resolution sub-ocean bottom imaging. The low frequency transmit beam's frequency is an arithmetic difference between the two primary frequencies. This beam maintains high spatial resolution or directivity. A receiving layer is collocated with the transmitting layer within the housing. The receiving layer is mechanically tuned by the other assembly layers to resonate at the low transmitted difference frequency.

The above and other objects and advantages of the present invention will become apparent from the following description, drawings and claims.

DETAILED DESCRIPTION OF THE INVENTION

A simple compact multi-layered transducer configuration for sub-ocean bottom imaging applications is disclosed whereby an arrangement of materials and their mechanical combination renders the device capable of withstanding hydrostatic pressures of the order of 9,000 psi.

The ability to simultaneously achieve both high spatial resolution or directivity, and low frequency (for sub-ocean bottom penetration) is realized with parametric mode sound generation. Two intense high frequency primary signals are provided to a transmitter. These signals interfere in the environmental medium and produce a low frequency acoustic beam whose frequency is the arithmetic difference between the two primaries. For example, 200 kHz and 220 kHz primary frequencies would yield a difference signal of 20 kHz. Furthermore, this low difference frequency acoustic wave has the desired high directivity that is resident in the primary frequency waves.

The transducer consists of a parametric mode transmitter element and a high gain receiver element collocated within the same housing. The receiver's sensitivity response is mechanically tuned with the overlying layers to resonate within a parametric mode difference frequency range. Due to its layered packaging design the transducer's size and frequency range of operation are scalable. Additionally, the transducer can employ multiple drivers and time delay techniques to steer the parametric mode acoustic beam.

Although the transmitter element works well in the parametric mode for transmission by providing directional low frequency sound, the same transmitter element does not perform well in the receive mode. The element, which is typically made from a piezoceramic material, must be thin to have its resonance frequency lie in the primary signal range in order to achieve the intense primary sound fields on transmission. At the difference frequency, the relatively thin transmitter element has low sensitivity because the sensitivity of the element is directly proportional to the element thickness or distance between the two electrode surfaces; furthermore, the transmitter element is operating well below resonance in the hydrostatic mode. Below resonance, the thickness mode stresses are partially cancelled by the out of phase lateral stresses. To overcome this low sensitivity problem a separate receiving element, preferably collocated with the transmit array, is required.

Figure 1A:
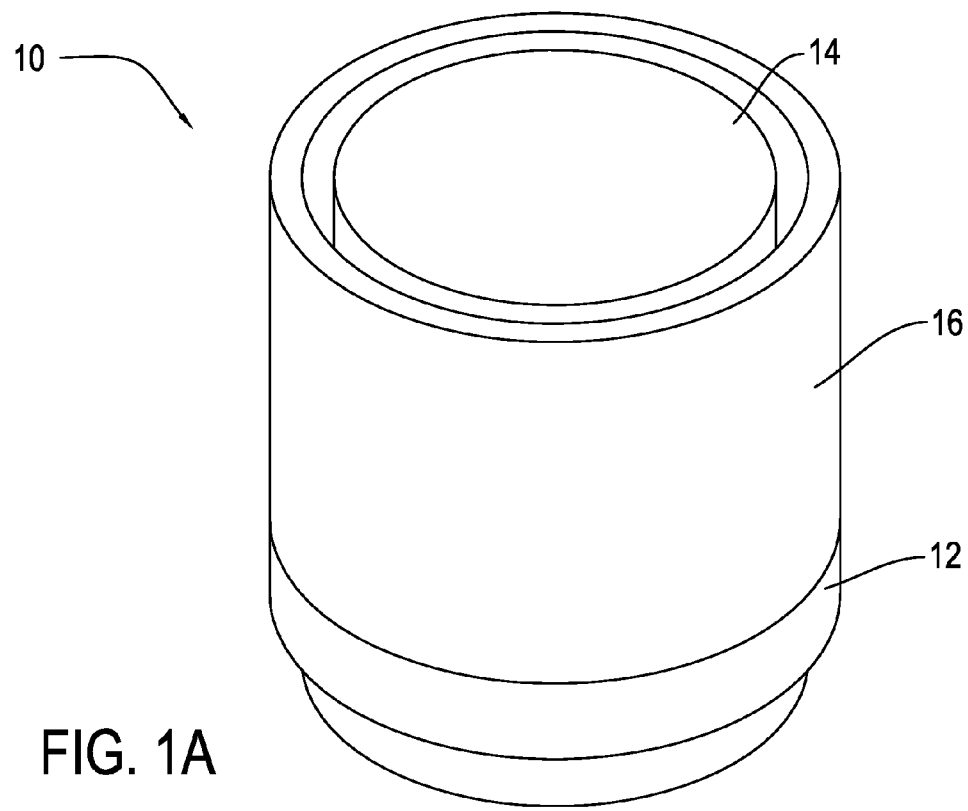
FIG. 1A is a perspective side view of a first embodiment of a transducer enclosed within a housing according to the principles of the invention.
Figure 1B:
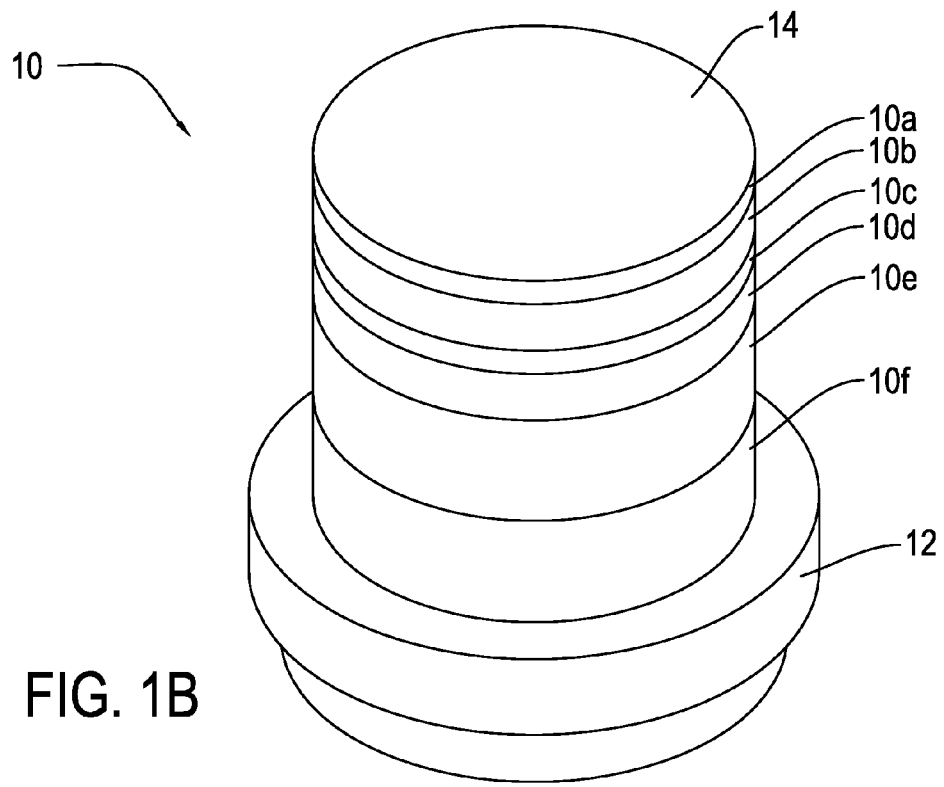
FIG. 1B is a perspective side view of the transducer of FIG. 1A with the housing removed.

Referring to FIGS. 1A and 1B, a parametric mode transducer 10 includes six passive and active layers 10a, 10b, 10c, 10d, 10e and 10f that are adhesively bonded together and encapsulated within a housing 16. Electrical cabling 22 (see FIG. 2) is joined to the active transmit and receive layers and extends through an encapsulated region of the transducer 10 to a side of a water proof bulkhead 12. The six layers 10a-10f, beginning at a radiating surface 14 and working toward bulkhead 12, are discussed below in greater detail.

A matching layer 10a is provided having a specific acoustic impedance between that of water and that of a transmitting layer 10b. Preferably matching layer 10a is made from an epoxy material. More precisely the specific acoustic impedance of the matching layer 10a is determined as the geometric mean of the values of the specific acoustic impedance of water and the specific acoustic impedance of the transmitting layer 10b. Also, the thickness of the matching layer 10a is chosen to be quarter-wave thick at the speed of sound through matching layer 10a.

Figure 2:
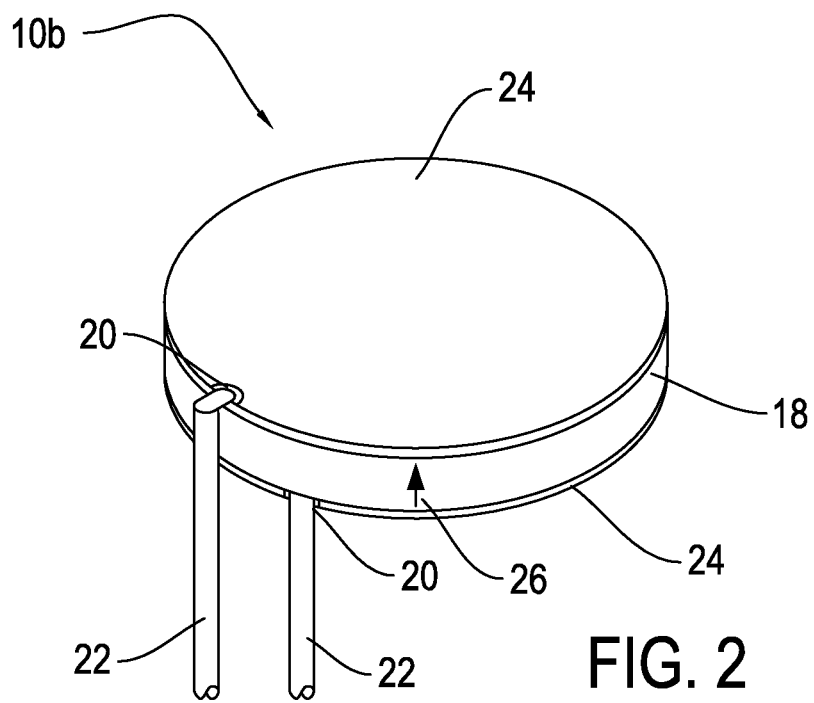
FIG. 2 is a perspective side view illustrating two U-shaped counter bores located at the edge of the transmitting layer of the transducer of FIG. 1B.

Transmitting layer 10b is shown in more detail in FIG. 2. A transducer material layer 18 is provided in electrical contact at 20 with conductors 22. An electrode 24 is positioned on each face of transducer material layer 18. The transducer material layer 18 is preferably made from a sheet of 1-3 piezoceramic polymer composite with conductive electrodes 24 thereon. Piezoceramic material used in this configuration would be poled in the direction indicated by arrow 26. Electrodes 24 are preferably copper electrodes formed on the transducer material through an electroplating process. The volume fraction of the piezoceramic to polymer and the polymer's dynamic modulus define the material's specific acoustic impedance which in turn determines the matching layer 10a composition as noted above. The thickness of the transmitting layer 10b is chosen to support a half wave resonance effect in the primary signal range of about 200 kHz. (At 200 kHz with the intended use in seawater, this leads to a thickness of about 6.23 mm or 0.25 in. Of course this thickness could be varied for different operating parameters.) Shown in FIG. 2 are two counter bores 20 located at the edge of the transmitting layer 10b that allow positive and negative electrical connections 22 to be flush with the major surface faces of the transducer material 18. This is critical for a uniform adhesive bond line between adjacent layer surfaces. It should be realized that other transducer materials and electrical connection methods could be used.

Layers 10c and 10d are provided to reduce the back radiation from the transmit array on receive element layer 10e by creating a vibration null at the receive element layer 10e. They also work in concert with the other upper layers 10a and 10b to mass load the receiving layer 10e, thus providing the required mechanical tuning. Layer 10c is made from a glass reinforced epoxy. This can be the glass cloth reinforced epoxy known in the art as G-10 or FR-4 or the like.

Figure 3:
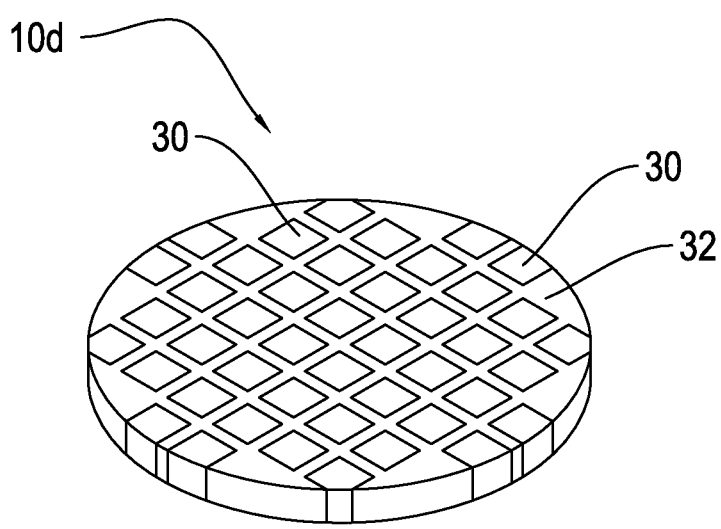
FIG. 3 is a perspective top view of the steel composite layer of the transducer of FIG. 1B.

Layer 10d provides an acoustic mass layer which is shown in more detail FIG. 3. Acoustic mass layer 10d includes rigid blocks 30 positioned in a backfill material 32. In the preferred embodiment, blocks 30 are steel blocks 30 arranged to yield a 56 percent volume fraction of steel. The backfill material 32 is an unvoided polymer. For applications of high pressure that is greater than 4,000 psi, use of the steel composite configuration and unvoided polymer backfill material is critical. During the transducer's development it was determined that surviving high pressures requires that all layers uniformly, radially compress. Any gross mismatch between layers is likely to result in an interfacial delamination damaging the device.

The next layer along the transducer 10 is the receiving layer 10e which preferably includes piezocomposite material having electrodes on either major side as shown in FIG. 2. Receiving layer 10e should have a thickness that satisfies the harmonic spring mass resonance condition at the difference frequency of the primary transmitter signals. As with the transmitting layer 10b, copper plating is used for the electrode surfaces. Counter bores allow electrical connections to the receiving layer 10e to be recessed for bonding purposes. Layer 10e features a thicker piezocomposite material substrate than transmitting layer 10b. This thickness and mechanical tuning by the mass of the upper layers 10b, 10c, and 10d, results in high receiver sensitivity.

The last of the six layers is the backing layer 10f. This material is a commercially available, particle loaded, syntactic foam composite. This material should be acoustically absorptive and capable of withstanding the 9,000 psi possible under operating conditions. Sound energy reaching the backing layer 10f is absorbed such that very little acoustic energy is reflected off the metallic bulkhead 12. The amount of absorption that the backing layer 10f provides is proportional to frequency and thickness.

In the above-described embodiment the transmit layer 10b and receiving layer 10e both have fixed beam direction and fixed directivity (i.e., beamwidth). Other embodiments having different transmit layer 10b and receive layer 10e configurations will allow beam reconfiguration and steering.

Figure 4:
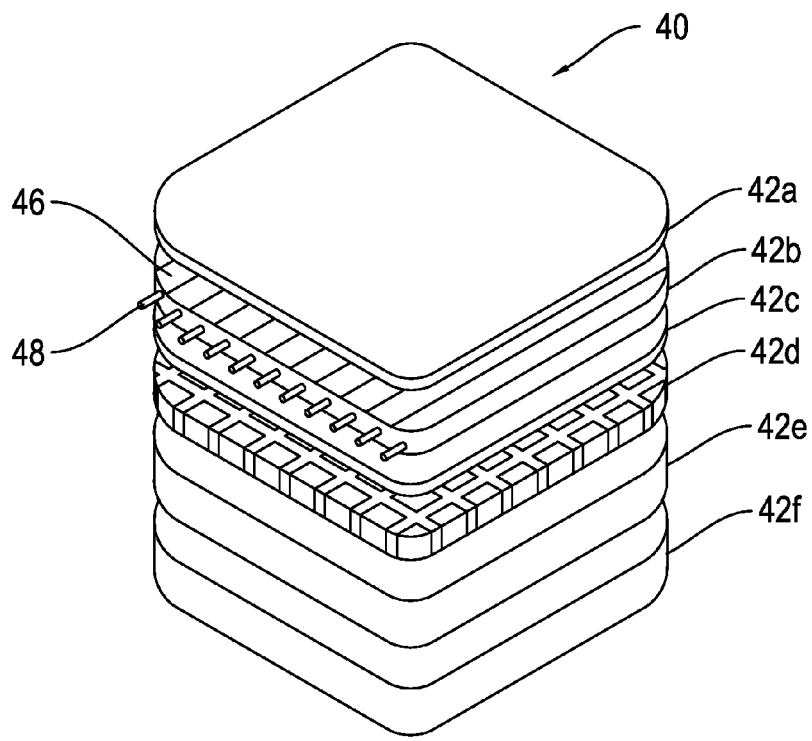
FIG. 4 is an exploded, perspective side view of a second embodiment of a transducer according to the principles of the invention.
Figure 5:
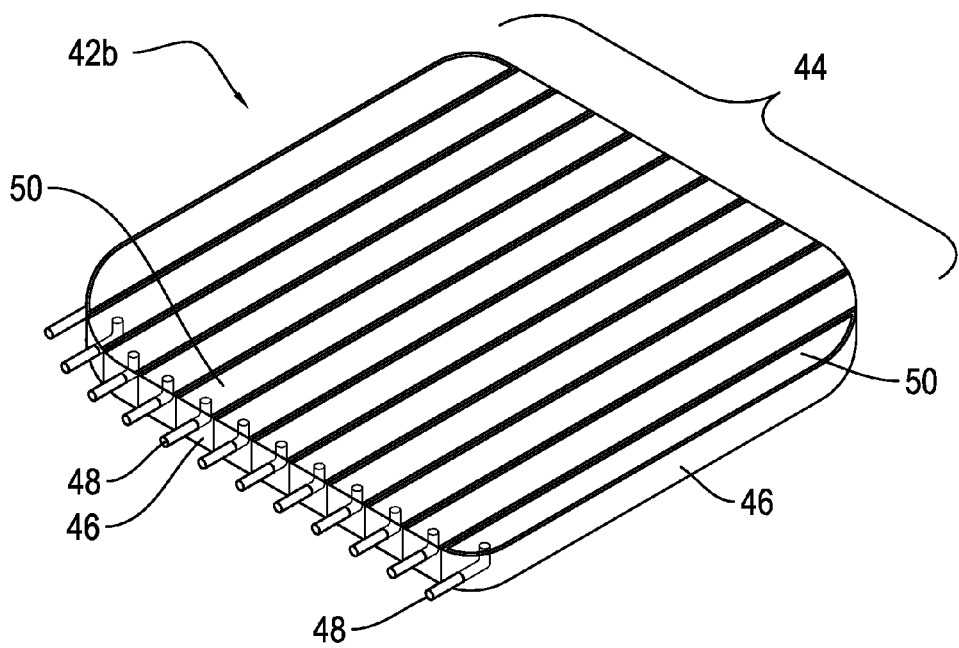
FIG. 5 is a perspective side view of one layer of the transducer of FIG. 4.

An exploded perspective view of a second embodiment is shown in FIG. 4. The transducer 40 includes a matching layer 42a, a transmitting layer 42b, a back radiation reduction layer 42c, a mass loading layer 42d, a receiving layer 42e, and a backing layer 42f. In this embodiment, transmitting layer 42b is configured as a linear array 44 of n separate elements, shown typically as 46. Through the use of n time delayed drive signals provided to each element, this embodiment provides a beam steering capability. FIG. 5 shows layer 42b in detail. Layer 42b includes an array 44 having elements 46. Electrical connections 48 are made to each side of the elements 46 by embedding the cabling within the transducer material, as described in U.S. Pat. No. 6,255,761, with the cable entering at the edge and contacting an electrode 50 formed on one of the major surfaces. The electrodes 50 are preferably created by electroplating the major planar face with copper. This plating can be patterned to form electrodes 50 that will make electrical contact with the connection 48's cross section.

Figure 6:
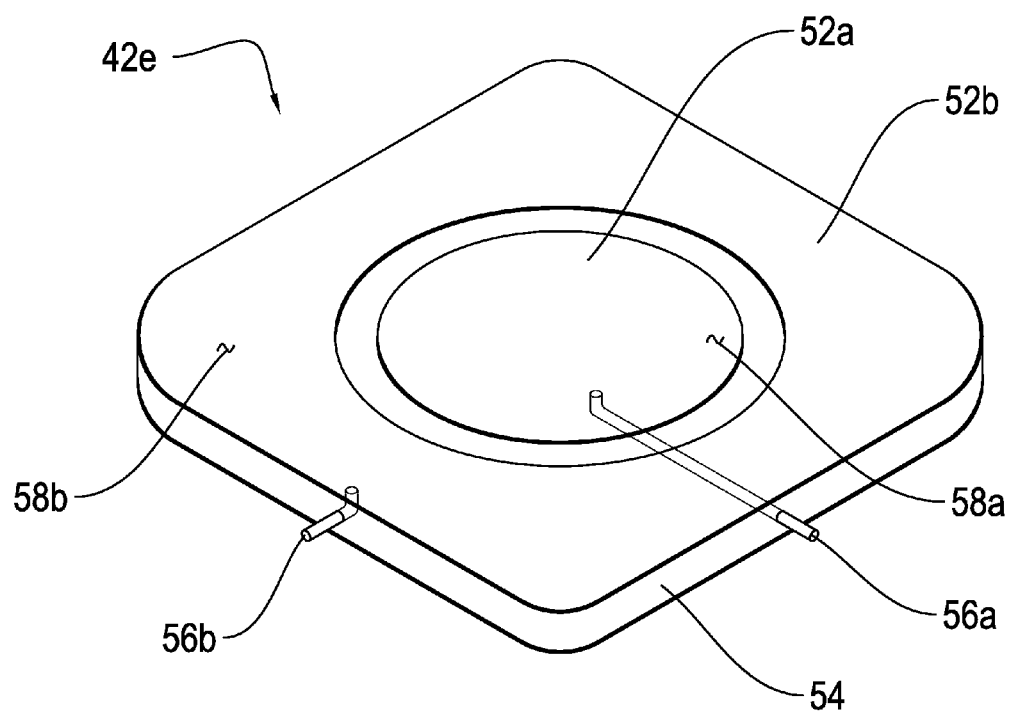
FIG. 6 is a perspective side view of one layer of a second embodiment of a transducer such as that shown in FIG. 4.

In yet a third embodiment as shown in FIG. 6, receiving layer 42e of the embodiment shown in FIG. 4 is subdivided to form m smaller transducers 52a and 52b for either beam steering as noted above or for varying the receive beam's directivity. FIG. 6 shows a dual aperture receiving element 42e where m is equal to 2. Transducer material 54 such as a piezoceramic composite is provided as the substrate of receiving layer 42e. Transducer 52a has a connection 56a positioned within material 54 and contacting an electrode 58a. Electrode 58a is positioned on the desired area of transducer material 54. Likewise, transducer 52b is provided with a connection 56b positioned within material 54 and contacting an electrode 58b. Area shading is realized through apodization of the electrodes 58a and 58b.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A transducer assembly for parametric sonar comprising:
   a transmitting layer capable of generating two primary high frequency signals, said two primary high frequency signals having a non-zero difference frequency, said two primary high frequency signals being capable of interfering to produce a low frequency acoustic beam at the difference frequency, said transmit layer having a thickness of about one-half wavelength of an operating range of said two primary high frequency signals;
   at least one filtering layer located adjacent to said transmitting layer capable of reducing back acoustic radiation created by said transmitting layer; and
   a receiving layer located adjacent to said at least one filtering layer such that said at least one filtering layer is interposed between said transmitting layer and said receiving layer, said receiving layer having a thickness suited to resonance at the difference frequency;
   wherein said at least one filtering layer comprises:
   a first back radiation reduction layer made from an unvoided polymeric backfill material; and
   a second back radiation reduction layer having metallic blocks positioned in the same unvoided polymeric backfill material as the transmitting and receiving layers, said second back radiation reduction layer providing mass loading.

2. The apparatus of claim 1 further comprising a housing having a first open end capable of being placed in acoustic communication with an operating environment and a bulkhead end substantially sealed from said operating environment, said housing defining a transducer cavity, said transmitting layer being positioned in said transducer cavity proximate to the first open end, and said receiving layer being positioned in said transducer cavity proximate to the bulkhead end.

3. The apparatus of claim 2 further comprising a backing layer positioned between said receiving layer and said housing bulkhead end for preventing acoustic reflections from said housing bulkhead end, said backing layer being made from a particle loaded, syntactic foam composite being capable of withstanding the environmental operating pressures of the apparatus.

4. The apparatus of claim 1 further comprising a matching layer positioned adjacent to the transmitting layer, said matching layer having a specific acoustic impedance between that of the transmitting layer and that of an expected environmental medium of transmission.

5. The apparatus of claim 4 wherein said matching layer has a thickness of one-quarter wavelength at the speed of sound in the matching layer.

6. The apparatus of claim 1 wherein the second back radiation reduction layer includes steel blocks as the metallic blocks arranged in the polymeric backfill such that the steel blocks provide about a 56% volume fraction of steel.

7. The apparatus of claim 1 wherein the transmitting layer includes a plurality of transmitting elements.

8. The apparatus of claim 1 wherein the receiving layer includes a plurality of receiving elements.

9. The apparatus of claim 1 wherein said transmitting layer is made from a piezoelectric composite material.

10. The apparatus of claim 1 wherein the transmitting layer is made from a piezoelectric composite material.

11. A transducer assembly for parametric sonar comprising:
    a transmitting layer capable of receiving two primary high frequency signals, said two primary high frequency signals having a non-zero difference frequency, and said transmit layer being capable of producing a low frequency acoustic beam at the difference frequency, said transmit layer having a thickness of about one-half wavelength of an operating range of said two primary high frequency signals;
    a matching layer located between the transmitting layer and an outside environment, said matching layer having a specific acoustic impedance between that of the transmitting layer and that of an expected environmental medium of transmission;
    at least one filtering layer located adjacent to said transmitting layer capable of reducing back acoustic radiation created by said transmitting layer; and
    a receiving layer located adjacent to said at least one filtering layer such that said at least one filtering layer is interposed between said transmitting layer and said receiving layer, said receiving layer having a thickness suited to resonance at the difference frequency;
    wherein said at least one filtering layer comprises:
    a first back radiation reduction layer made from an unvoided polymeric backfill material; and
    a second back radiation reduction layer having metallic blocks positioned in the same unvoided polymeric backfill material as the transmitting and receiving layers, said second back radiation reduction layer providing mass loading.

12. The apparatus of claim 11 wherein the second back radiation reduction layer includes steel blocks as the metallic blocks arranged in the polymeric backfill such that the steel blocks provide about a 56% volume fraction of steel.

13. The apparatus of claim 11 further comprising a housing having a first open end capable of being placed in acoustic communication with an operating environment and a bulkhead end substantially sealed from said operating environment, said housing defining a transducer cavity, said transmitting layer being positioned in said transducer cavity proximate to the first open end, and said receiving layer being positioned in said transducer cavity proximate to the bulkhead end.

14. The apparatus of claim 13 further comprising a backing layer positioned between said receiving layer and said housing bulkhead end for preventing acoustic reflections from said housing bulkhead end, said backing layer being made from a particle loaded, syntactic foam composite being capable of withstanding the environmental operating pressures of the apparatus.

* * * * *